No. 888,442.  
PATENTED MAY 19, 1908.

M. E. KELLER.  
ANIMAL FEED BAG.  
APPLICATION FILED JULY 3, 1907.

Witnesses:  
Harry C. Hebig  
M. Horkovitz

Inventor  
Max Emil Keller  
By his Attorney  
Edward S. Beach

UNITED STATES PATENT OFFICE.

MAX EMIL KELLER, OF NEW YORK, N. Y., ASSIGNOR, BY MESNE ASSIGNMENTS, OF ONE-HALF TO PETER CHRISTENSEN, OF NEW YORK, N. Y.

ANIMAL FEED-BAG.

No. 888,442.      Specification of Letters Patent.      Patented May 19, 1908.

Application filed July 3, 1907. Serial No. 382,023.

*To all whom it may concern:*

Be it known that I, MAX EMIL KELLER, a subject of the German Emperor, residing at New York city, in the county of New York and State of New York, have invented certain new and useful Improvements in Animal Feed-Bags, of which the following is a specification, reference being had therein to the accompanying drawings.

My invention relates to animal feed bags, and its object is to produce a feed bag of a construction which gives the animal adequate air while feeding and prevents the food from being thrown out of the bag when the animal suddenly lifts its head.

Figure 1:
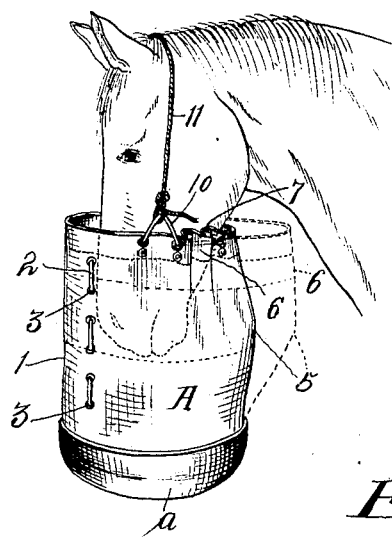
Figure 2:
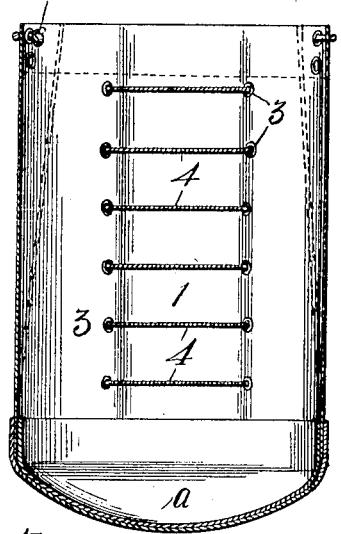
Figure 3:
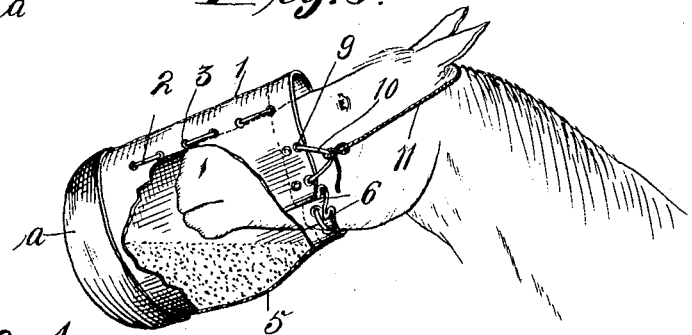
Figure 4:
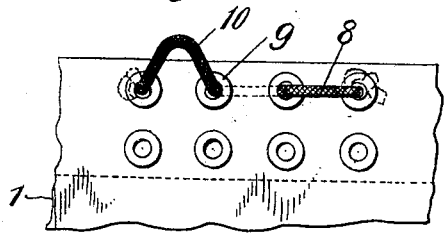
Figure 5:
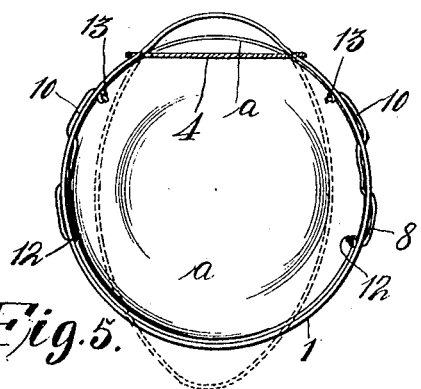

In the drawings, Figure 1 is a side elevation of my new bag, in place on the head of a horse; Fig. 2 is a vertical section thereof, at line 2—2, of Fig. 1, looking towards the front side of the bag, provided with an air-space; Fig. 3 is a view showing the rear upper edge of the bag puckered against the horse's under jaw when his head is thrown up, the air-space at the front of the upper jaw being maintained open; Fig. 4 is a view of one of the two gathering devices with which the open end of the bag is provided on opposite sides; and Fig. 5 is a top-plan view of the bag distended, looking down towards its bottom.

In the drawings, A represents my improved feed bag, *a* being its bottom, which may be of any desired construction. The front portion 1 of the feed bag forms a good-sized vertical air-space of the feed bag, so that the animal has plenty of air when feeding. This air-space is effected by means of a cord 2 reeved horizontally through grommets 3 mounted in vertical rows, one opposite another, towards the front side of the feed bag. Horizontal, transverse portions 4 of the cord 2 rest against the nose portion of the animal when the bag is in place, the air-space formed by the front portion 1 of the bag being thus permanently maintained, and extending from the top of the bag downwardly to its bottom. If the horse throws its head up, as horses commonly do while feeding, the transverse portions 4 of the cord come in contact with the front of the horse's nose, and the air-space is still preserved. It is very important that animals while feeding in bags should have plenty of air about their mouths and nostrils.

The rear side of the bag is preferably cut so as to bulge outwardly at 5, wherein, when the animal throws its head up, some portion of the food may be received, and supported out of contact with the animal's nose. This is a desirable feature of my new bag, another important feature of which is the rearward enlargement 6 of the upper rear part of the bag, back of the points of its support on the animal's head, so that there is, back of the lower jaw of the animal, a puckerable portion that can be puckered up automatically and held against the under side of the lower jaw when the animal throws up its head, to prevent the escape of food. Such is the purpose of the enlargement 6, the bulging part 5 being desirable rather than necessary.

To accomplish the puckering of the portion 6, and as indicated at 7, each opposite side of the bag, near its upper margin, is provided with a puckering cord 8, which is reeved through a series of grommets 9, and which is formed into a loop 10 for attachment to the ends of the head-strap 11 over the animal's head, and by means of which the bag is suspended when in use.

The inner rear ends of the puckering-cords 8 may be held in place by the knots 12, their front ends being held in place by the knots 13.

When the bag is loaded with food and the animal throws its head up, the weight of the bag pulls the opposite cords 8, and so puckers the rear top edge of the bag snugly up against the under jaw of the animal that the food cannot escape.

What I claim is:—

1. An animal feed bag provided, at its front portion, with transverse, flexible cords forming a vertical open-work partition which divides the interior of the bag into a front air-space and a feed-space rearwardly thereof.

2. An animal feed bag provided, at its front portion, with oppositely arranged vertical rows of perforations and an interior, vertical open-work cord partition, the cord being secured in said perforations and dividing the bag interiorly into a front air-space and a feed-space rearwards thereof.

3. The combination with an animal feed bag having, at its open end, a rearward puckerable portion which is provided along each opposite margin with a series of three or more perforations, of a pair of cords, each reeved through one of said series of perforations; each of said cords having its ends secured to the bag; and each of said cords having, between a pair of said perforations, a suspensory loop which, when elongated, draws on the remainder of the cord whereof the loop is formed, to pucker the rearward portion of the bag-top.

In testimony whereof I have affixed my signature in presence of two witnesses.

MAX EMIL KELLER.

Witnesses:
   EDWARD S. BEACH,
   M. HERSKOVITZ.